United States Patent [19]

Oishi

[11] Patent Number: 4,571,654
[45] Date of Patent: Feb. 18, 1986

[54] MAGNETIC TAPE CASSETTE HAVING IMPROVED MAGNETIC SHIELDING

[75] Inventor: Kengo Oishi, Kanagawa, Japan

[73] Assignee: Fuji Photo Film Co., Ltd., Kanagawa, Japan

[21] Appl. No.: 653,759

[22] Filed: Sep. 24, 1984

[30] Foreign Application Priority Data

Oct. 26, 1983 [JP] Japan .......................... 58-164714[U]

[51] Int. Cl.$^4$ ............................................ G11B 15/60
[52] U.S. Cl. ............................... 360/130.21; 360/132; 242/199
[58] Field of Search .......... 360/130.21, 130.3, 130.31, 360/130.32, 130.33, 132, 134, 137; 242/197–200

[56] References Cited

U.S. PATENT DOCUMENTS 4,257,077  3/1981  Ishida .............................. 360/132 X
4,484,242  11/1984  Kimizuka et al. ............... 360/132 X Primary Examiner—John H. Wolff
Attorney, Agent, or Firm—Sughrue, Mion, Zinn, Macpeak and Seas

[57] ABSTRACT

A magnetic tape cassette having improved magnetic shielding and which is therefore more suitable for high density recording. A cassette case body is provided with through-holes located behind an opening into which the magnetic head is inserted for recording and reproduction, penetrating the cassette case body vertically. A shield member is mounted to slidably move back and forth in the cassette, and is urged towards the rear of the cassette by a spring. The shield member has a through-hole which confronts the through-holes of the cassette case body and a shield wall which confronts the magnetic head when the magnetic head is inserted into the opening. The shield member is slid towards the front of the cassette by a slide bar inserted into the through-hole of the cassette case body when the cassette is loaded for recording or reproduction.

8 Claims, 4 Drawing Figures

MAGNETIC TAPE CASSETTE HAVING IMPROVED MAGNETIC SHIELDING

BACKGROUND OF THE INVENTION

The present invention relates to magnetic tape cassettes, and more particularly to a compact cassette used for audio use which is provided with an improved shield member.

Recently, cassette tape recorders have been remarkably reduced in both size and weight. In this connection, there has been a strong demand for provision of magnetic tape cassettes of small size and high quality which are suitable for high-density signal recording and reproducing operations. In order to meet this requirement, various magnetic tape cassettes, and also magnetic heads, have been proposed. In the design of the magnetic tape cassette, an important consideration is how to block stray external magnetic fields (hereinafter referred to merely as "noise" when applicable) during signal recording and reproducing, which is essential for maintaining good recording and reproducing characteristics.

For the above-described purpose, in a conventional magnetic tape cassette, as shown in FIG. 1, a shield plate 1 which is U shaped in cross section is provided in the opening 2 into which a recording and reproducing head 3 is inserted for recording and reproducing. A pair of head pins 4 are provided on a base 5 in the opening 2 on opposite sides of the magnetic head 3. A leaf spring 7 with a pressure pad is mounted on the base 5. The shield plate 1 is fitted in the cassette half in such a manner as to hold the leaf spring 7 from behind, and is itself held by the upper and lower cassette halves. A partition 8 is formed behind the shield plate 1 to separate the tape accommodating region and the recording and reproducing region from each other.

The shield plate prevents the magnetic head 3 from picking up external noise during a recording or reproducing operation. It is well known in the art that the shielding effect of the shield plate thus constructed can be improved by forming it of a material providing a higher shielding effect, by designing the shield plate so as to cover more of the magnetic head, or by disposing the shield plate closer to the magnetic head 3.

If the first method is employed, the manufacturing cost of the shield plate 1 is increased. Also, it is difficult to cover more of the magnetic head with the shield plate because of the dimensional standards of the cassette. With the structure of the opening 2 as described above, it is considerably difficult to set the shield plate 1 closer to the magnetic head 3 because of the dimensions of the shield plate and the dimensions of the magnetic head. In other words, since the shield plate 1 and the leaf spring 7 are small components and are arranged in engagement with each other, and since the shield plate 1 is held by the upper and lower cassette halves, it becomes more difficult to mount the shield plate 1. If the width of both end pieces 9 of the shield plate 1 is made smaller so that the shield plate 1 can be set closer to the magnetic head 3, then the assembly of the cassette becomes more difficult and there is a greater likelihood that the components will be assembled unsatisfactorily. When the magnetic head is mechanically inserted into the cassette, it tends to undergo an overdamped movement until it is held stably. Therefore, if the shield plate is closer to the magnetic head, then the latter may contact the former.

SUMMARY OF THE INVENTION

In view of the foregoing, an object of the invention is to provide a magnetic tape cassette having a shield plate which provides an improved shielding effect but which is simple to assemble.

The foregoing object and other objects of the invention have been achieved by the provision of a magnetic tape cassette which incorporates a pair of hubs on which a magnetic tape is wound, which has an opening into which a magnetic head is inserted, and which, according to the invention, includes a cassette case body having through-holes which are located behind the opening for the magnetic head and penetrate the cassette case body vertically, and a shield member which is slidable back and forth in the cassette and is urged towards the rear of the cassette by an elastic member and which comprises a body having a through-hole which confronts the through-holes of the cassette case body and a shield wall which confronts the magnetic head which is inserted into the opening, the shield member being slid towards the front of the cassette by a slide bar inserted into the through-hole of the body.

DESCRIPTION OF THE PREFERRED EMBODIMENTS

The invention will be described with reference to preferred embodiments shown in the accompanying drawings.

Figure 1:
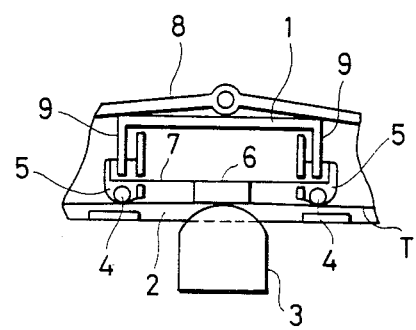
FIG. 1 is a plan view showing the area around the magnetic head opening of a conventional magnetic tape cassette.
Figure 2:
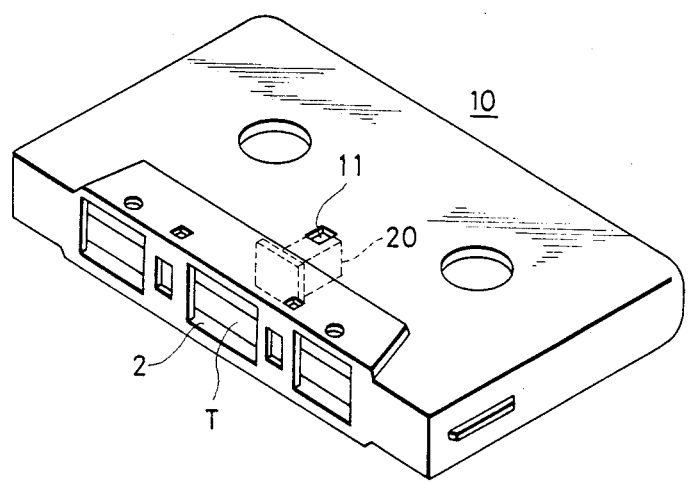
FIG. 2 is a perspective view showing an example of a magnetic tape cassette according to the invention.

FIG. 2 is a perspective view of an example of a magnetic tape cassette constructed according to the invention.

As is apparent from FIG. 2, the magnetic tape cassette 10 is different in appearance from a conventional compact cassette only in one point, namely, through-holes 11 penetrate the cassette vertically and are located behind an opening 2 formed in the front of the cassette and on the center line which divides the cassette into right and left halves. A shield member 20 (FIG. 3), provided in the cassette 10 confronting the through-hole 11, is slidable back and forth. Similar to a conventional cassette, a magnetic tape T wound on a pair of hubs is laid in the magnetic tape cassette 10 in such a manner that it can run along the opening 2.

Figure 3:
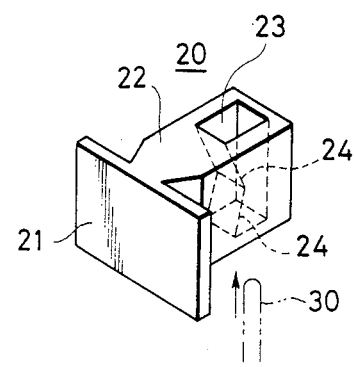
FIG. 3 is a perspective view showing a shield member used in the magnetic tape cassette according to the invention.

The shield member 20 incorporated in the magnetic tape cassette 10 is shown in FIG. 3. The shield member 20 has a shield wall 21 and a body 22 perpendicular to the shield wall 21, thus being substantially T-shaped when viewed from above. The body 22 has a through-hole 23 which penetrates the body vertically. The wall of the through-hole 23 closer to the shield wall 21 consists of two tapered walls 24 formed symmetrically in the vertical direction with the upper and lower openings becoming gradually narrower towards the center of the through-hole 23.

Figure 4:
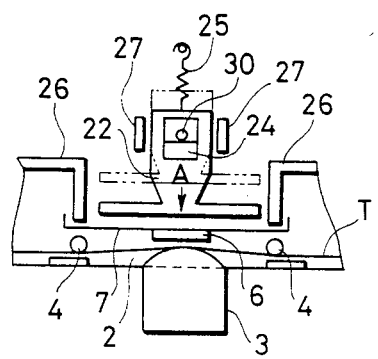
FIG. 4 is a plan view showing essential components of the cassette according to the invention.

The arrangement and operation of the shield member 20 will be described with reference to FIG. 4. The shield member 20 is positioned so that the shield wall 21 is directed towards the front of the cassette and the through-hole 23 confronts the through-holes 11. The shield member 20 is urged rearwardly of the cassette by a tension spring 25. That is, the shield wall 21 of the shield member 20 is set in correspondence to the position of the shield plate in the ordinary cassette. The position of a leaf spring 7 with a pressure pad 6 is regulated by the end faces of a pair of partitions 26 which are positioned in such a manner that there are small gaps between the end faces and head pins 4. That is, the leaf spring 7 is held at the same position as that in a conventional magnetic tape cassette. A magnetic tape is laid in the cassette in such a manner that it runs along the head pins 4 as in the conventional cassette.

A pair of guide members 27 are formed in the cassette to guide the shield member 20 towards and away from the front of the cassette without shifting to the right and left.

The shield member is arranged so that, when the magnetic tape cassette is not in use, the position of the shield wall 21 is substantially the same as that of the shield plate 1 in the conventional cassette. The portion of each of the partitions 26 which is close to the shield member 20 is L shaped when viewed from above.

When the magnetic tape cassette is loaded in the recording and reproducing device, a slide bar 30 is inserted into the through-hole 11 from above or below in the cassette inserting section so that the shield member 20 is slid towards the front of the cassette (as indicated by the arrow A). More specifically, as the slide bar 30 is inserted into the through-hole 11, the slide bar 30 pushes the tapered wall 24 to slide the shield member 20 towards the front of the cassette, as a result of which the shield wall 21 is held close to the slide region of the magnetic head 3 and the magnetic tape T.

The cassette is designed so that, when the shield member 20 has been slid forwardly, the gap between the shield wall 21 and the slide region is a minimum. It is desirable for the thickness of the pressure pad 6 to be as small as possible.

The slide bar 30 may be so designed that it is automatically inserted into the through-hole 11 when the magnetic tape cassette is loaded in the cassette inserting section, or manually inserted thereinto after the cassette has been loaded.

The shield member 20 can be made of a material having a magnetic shielding effect such as iron, silicon steel or permalloy. The shield member may be formed so that only the shield wall 21 is of the above-described metal material. Furthermore, the shield member may be molded with a plastic resin such as polyacetal or ABS resin in such a manner that at least the shield wall 21 contains the powder of one of the above-described materials.

According to the invention, the shield wall 21 of the shield member 20 can be set extremely close to the magnetic head 3, and therefore the shielding effect is much higher than that of the conventional shield plate 1 of the stationary type. Especially in a recording and reproducing operation at a high density, the recording and reproducing characteristic can be improved with the use of the invention.

The shield member 20, unlike the conventional shield plate 1, is not in the form of a plate, and accordingly, it is unnecessary to fit the shield member between the upper and lower halves in the assembly of the cassette. Since the shield member is relatively large, it can be more readily set in the cassette compared with the conventional shield plate 1.

According to the invention, the shield wall 21 comes closer to the magnetic head 3 than the conventional shield plate 1, thus providing a higher shielding effect. Therefore, the shield wall 21 may be made of lower grade material than the shield plate 1, with the result that the manufacturing cost is lowered.

The magnetic tape cassette 10 can be used in a recording and reproducing device which has no slide bar 30, completely in the same manner as the conventional compact cassette.

I claim:

1. A magnetic tape cassette for use in a cassette tape machine having a slide bar which is inserted through said cassette, said cassette having a pair of hubs on which a magnetic tape is wound, and an opening at a front side of the cassette into which a magnetic head is inserted, said cassette comprising: a cassette case body having first through-holes located behind said opening and penetrating said cassette case body substantially parallel to said front side; and a shield member in said cassette slidable toward and away from said opening and urged away from said opening by an elastic member, said shield member comprising: a body having a second through-hole which is in substantial alignment with said first through-holes of said cassette body, and a shield wall of said shield member which confronts said magnetic head when said head is inserted into said opening, said slide bar being inserted into said second through-hole of said body, thereby causing said shield member to slide toward said front side of said cassette.

2. The magnetic tape cassette of claim 1, wherein the entirety of said shield member is made of a magnetic shielding material.

3. The magnetic tape cassette of claim 1, wherein, of said shield member, only said shield wall is made of a magnetic shielding material.

4. The material tape cassette of claim 1, wherein, of said shield member, at least said shield wall is made of a material selected from the group consisting of iron, silicon steel and permalloy.

5. The magnetic tape cassette of claim 1, wherein said shield member is made of a plastic resin of which at least said shield wall contains powder of a material selected from the group consisting of iron, silicon steel and permalloy.

6. The magnetic tape cassette of claim 1, wherein said through-hole in said shield member is tapered inwardly from both sides of said cassette case body.

7. The magnetic tape cassette of claim 1, wherein said cassette case body comprises a pair of guide members for guiding said shield member to slide toward and away from said opening in said cassette.

8. The magnetic tape cassette of claim 7, wherein said cassette case body comprises a pair of L-shaped partitions, one arranged on either side of said shield member, end faces of said partitions being positioned so as to provide small gaps between said end faces and head pins.

* * * * *